United States Patent [19]

Higashiyama et al.

[11] 4,306,258
[45] Dec. 15, 1981

[54] MAGNETIC HEAD SUPPORTING MECHANISM OF DOUBLE SIDE TYPE FLEXIBLE DISC DRIVE APPARATUS

[75] Inventors: Noboru Higashiyama; Shin Isozaki; Kanji Sakurai; Masaru Sasaki, all of Kamakura, Japan

[73] Assignee: Mitsubishi Denki Kabushiki Kaisha, Tokyo, Japan

[21] Appl. No.: 48,367

[22] Filed: Jun. 14, 1979

[30] Foreign Application Priority Data

Jun. 26, 1978 [JP] Japan .............................. 53-87835[U]
Jun. 26, 1978 [JP] Japan .............................. 53-87836[U]

[51] Int. Cl.³ ........................ G11B 5/016; G11B 5/48; G11B 21/20; G11B 5/54
[52] U.S. Cl. .................................. 360/99; 360/104; 360/105
[58] Field of Search ................ 360/99, 103, 104, 105

[56] References Cited

U.S. PATENT DOCUMENTS

| | | | |
|---|---|---|---|
| 4,089,029 | 5/1978 | Castrodale et al. | 360/99 |
| 4,129,891 | 12/1978 | Ragle et al. | 360/99 |
| 4,151,573 | 4/1979 | Tandon et al. | 360/104 |
| 4,167,766 | 9/1979 | Chau | 360/104 |

Primary Examiner—Robert S. Tupper
Attorney, Agent, or Firm—Oblon, Fisher, Spivak, McClelland & Maier

[57] ABSTRACT

A magnetic head supporting mechanism equipped with a magnetic head positioning carriage of a interchangeable double side type flexible disc drive apparatus comprising a carriage having a pair of arms which is rotated in detachable to a double side type flexible disc and arms, and arm parts in the arms and sliding type magnetic heads which are respectively mounted on the arm part and slide on the surface of the flexible disc and gimbal spring placed between each sliding type magnetic head and each arm part.

7 Claims, 17 Drawing Figures

MAGNETIC HEAD SUPPORTING MECHANISM OF DOUBLE SIDE TYPE FLEXIBLE DISC DRIVE APPARATUS

BACKGROUND OF THE INVENTION

1. Field of the Invention

The present invention relates to an improvement of a magnetic head supporting mechanism in a interchangeable double side type flexible disc drive apparatus.

2. Description of the Prior Arts

It has been required to increase the capacity of memory and to reduce memory cost, and the demands made on memories have been remarkably increased. A flexible disc drive apparatus which is mainly used in a compact computer is a single side recording apparatus as well known.

In the past, only a single side of the flexible medium held in a flexible disc cartridge used as a memory medium has been used as a magnetic recording memory. In view of the requirement of improving cost performance, a double side type flexible disc cartridge using both surfaces of the medium as the memory surfaces and a double side type flexible disc drive apparatus has been commercialized. In the single side flexible disc cartridge, the medium is pushed from the back surface in contact with one magnetic head mounted on a carriage provided for moving and determining the position of the magnetic head in the radial direction, and the head is slided on the medium to perform write-in or read-out, and accordingly, the mechanism is relatively simple and quality control for the signals is easy.

In such an apparatus, the back surface of the medium is pushed by a pad made of a soft material to make contact between the medium and the head. On the other hand, in the double side type apparatus, the magnetic head is brought into contact with both surfaces of the flexible medium and accordingly, there are various manufacturing problems related to the stability of quality of signals and medium wear, in comparison with the single side apparatus.

In the single side apparatus, no medium wear is observed except in case of rough head surface, because the head surface is spherical and pressured by a soft pad from the back side.

However, in the double side apparatus, a pad can not be used, since the magnetic heads should be located on both surfaces of the medium. Accordingly, a wearing loss of the medium is produced by the magnetic heads on both sides of the medium. As the most severe problem, it is hard to prevent instant shock at the time of contacting of the medium by the magnetic heads. In order to prolong the life of the medium it has been considered to employ a method of maintaining a noncontacting condition during positioning of the magnetic head to a predetermined track or during non-operation of the apparatus, and contacting the medium at the time just before starting the read-out or the write-in. However, a peeling phenomenon is easily caused in the medium by repeating such contacts. In order to prevent such trouble, it is necessary to consider severe quality controls for the roundness value R of edges of the magnetic heads and a roughness of the surface of the magnetic head, a control of the contacting speed of the magnetic heads to the medium and a control of the angles of the magnetic head surfaces to the medium at the moment of contact. The double side type head supporting mechanism is one piece formed of a combination of a pressure arm and a cantilever spring supporting arm whereby the pressure force should be minimized in view of the life of the medium. Accordingly, remarkably soft structure is required to reduce the pressure force whereby the manufacturing process is quite difficult and the quality of signals is unstable.

The present status of the conventional double side type apparatus will be further described.

Figure 1:
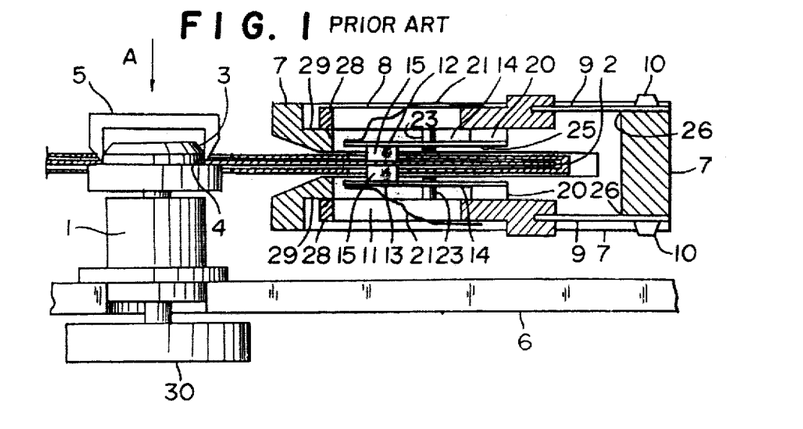
FIG. 1 is a sectional view of a conventional head supporting mechanism.
Figure 2:
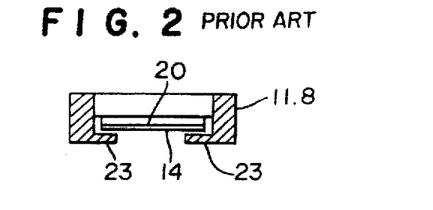
FIG. 2 is a sectional view of an arm in the conventional head supporting mechanism wherein projections (23), (23) formed in one piece with each arm (8), (11) which hook each magnetic head assembly (12), (13) when the assemblies (upper or lower) (12), (13) are approached or departed by the arms (upper or lower) and the arm is in the free state when a magnetic head (15) is brought into contact with a magnetic memory medium (2)

In FIGS. 1 and 2, the reference numeral (1) designates a spindle for giving a predetermined rotation to a magnetic memory medium in a flexible disc cartridge (2); (3) designates a cone on the spindle (1) which is fitted to a round hole (4) formed at the center of the medium (2); (5) designates a spindle cup for fitting the medium (2) to the spindle (1) by pushing the medium (2) from the upper position to the arrow direction A. The mechanism for supporting and rotating the spindle cup (5) is not shown since it is not important. The reference numeral (6) designates a body base for fitting and fixing the spindle (1). The magnetic memory medium (2) is rotated since the spindle (1) is rotated by a belt (not shown) on a pulley (30) formed in one piece with one end of the cone (3) and the belt is driven by a motor (not shown). A carriage body (7) is driven to change its position at the radial direction of the magnetic memory medium (2) by a lead screw or a belt, etc. (not shown). The driving source can be a known stepping motor (not shown). The stepping motor is firmly fixed on the body base (6) by L-shape fittings (not shown). An upper arm (8) is fixed on the carriage body (7) through a plate spring (9) with a screw (10). A lower arm (11) is fixed in the same manner. The plate spring (9) is formed in one piece by a mold inserting in an injection molding process with the upper arm (8) or the lower arm (11) as shown in the drawing. The reference numeral (28) designates each end of the upper or lower arm (8), (11); (29) designates an arm receiving surface formed on the carriage body. A projection (23) formed on each of the arms (8), (11) assists to suspend the support arm (14) to detach it from the surface of the magnetic memory medium (2). Each magnetic head assembly (12), (13) is firmly respectively fixed on the upper arm (8) and the lower arm (11) with each screw (25). The reference numeral (14) designates a head support arm attached by each screw (25). The reference numeral (20) designates a mounting base, which can be formed in one piece with arm (14) by a spot welding. A sliding type magnetic head (15) is firmly bonded on the end of the arm (14) with adhesive, etc. The reference numeral (21) designates a printed wiring flexible cable connected to the coil wound on the head (15) to lead out signals therefrom.

Figure 3:
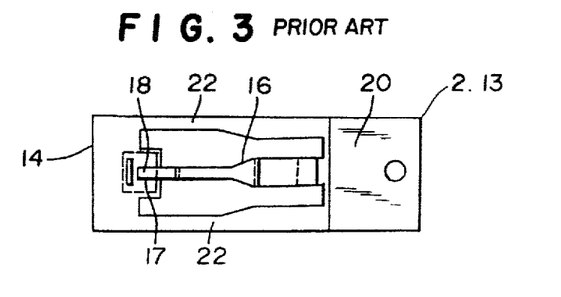
FIG. 3 is a plane view of a conventional magnetic head assembly.
Figure 4:
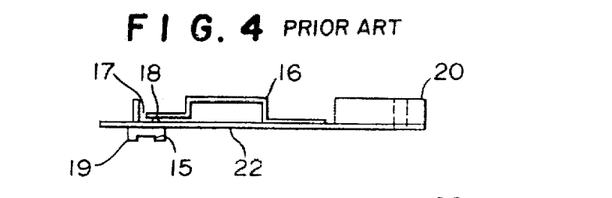
FIG. 4 is a side view of a conventional magnetic head assembly in operation.
Figure 5:
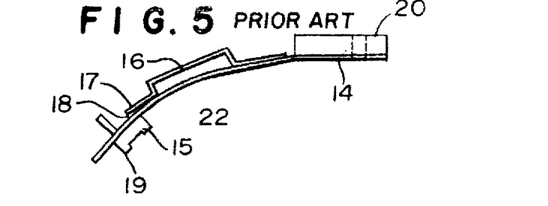
FIG. 5 is a side view of the conventional magnetic head assembly in the standby condition illustrating the bended state of a supporting part.

Referring to FIGS. 3, 4 and 5, the functions of the conventional magnetic head assemblies (12), (13) will be further illustrated.

The basic condition for using the magnetic memory medium (2) for a desired sliding life is to minimize the pressure force of the head (15) in an allowable range for maintaining signal output amplitude on the whole track without causing an amplitude modulation. In order to maintain a good following characteristic in its sliding operation to the flutter of the magnetic memory medium (2), a spring metal plate having a fine thin thickness is used as the support arm (14). Moreover, a pressure arm (16), is welded to the support arm (14) by a spot welding, to apply the pressure force on to the head (15). The end (17) of the pressure arm (16) is formed to push the projection (18) formed on the support arm (14).

The magnetic head assemblies (12), (13) are mechanically highly biased to the medium side when in a standby status by the pushing force applied to the projection (18) of the pressure spring (16), as in FIG. 5. In such structure, it is difficult to give an ideal design wherein the end (17) of the spring (16) is correctly located at the top of the projection (18) in its operation. The stress in a rolled flat plate is not uniform, the stress is released at the time of cutting whereby the support arm (14) cut from a flat thin plate can not be kept completely. Moreover, the flatness of the support arm is adversely effected by the heat given by the spot welding of the support arm (14) on the base (20). When these causes are piled up, the sliding surfaces of the heads (15) mounted in the carriage cannot be kept in parallel with the medium (2) in operation. The deviation of flatness of the support arm (14) causes also a deviation of line of force from being perpendicular to the surace of the medium (2) passing through a top of the projection for load (18) whereby the pressure force slanted with respect to the surface of the head (15) is imparted and accordingly, a slant gap is formed between the medium and the head to cause reproducing loss. Because of the deterioration of the flatness of the support arm (14) and the slant pressure force due to its uncertain dimension by its complex shape, the pressure spring (16) causes quick motion which deteriorates its output amplitude modulation excessively by the rotation of the medium (2). Moreover, as the magnetic head assemblies (12), (13) having such problems are located facing each other, combined adverse effects result whereby it is not easy to adjust them.

The undesirable amplitude modulation has been illustrated. As well known, such disc memory system has an important merit for interchangeability of the medium (2) so that the disc memory system has flourished. Thus, the conventional magnetic head assemblies (12), (13) have the disadvantage, that is, it is difficult to keep the positions of the magnetic heads (15), (15) for the magnetic gap within an allowable tolerance in their assembly because of the tendency for the support arms (14), (14) not to be flat and because of the cantilever structure of the support arms (14), (14). Thus, when they are mounted in the assembly, it is necessary to adjust the upper arm (8) and the lower arm (11) to the radial direction referring to the recorded standard medium in its operating test. Therefore, this further causes an output instability. Once the coincidence with line of force for the upper and lower magnetic head assemblies (12), (13) is found to provide stable amplitude, however the coincidence region is shifted by the adjustment of the magnetic gap position so that the undesirable condition is given.

On the other hand, the magnetic heads (15), (15) are departed from the surface of the medium while waiting so as to prolong the life of the medium in operation, as mentioned. At the moment for touching again the two facing magnetic heads come into collison with each other at each edge (19) of the magnetic head (15), through the medium (2) in the step of contacting operation. In order to improve the following characteristics of the magnetic head (15) to the radial direction and the circumferential direction, a fine thin plate is used as the support arm whereby it can not be balanced to the pressure spring (16), and the support arm (14) is bended as mentioned. Therefore, when the upper arm (8) and the lower arm (11) are turned to depart from the surface of the medium (2) around the fastening edges (26), (26) of the plate springs (9), (9) in the practical operation, the facing angles between the sliding surfaces of the magnetic heads (15), (15) and the surfaces of the medium (2) are held slanted with respect to each other and hard impacts are applied to both surfaces of the medium (2) upon subsequent touching by the edges (19), and accordingly, the damage is produced in an earlier period, to cause low industrial value. In order to overcome the disadvantage, the edges (19) should be formed to have the desired roundness R and is processed to form mirror surface. However, a hard brittle material is used as the slider, many processing steps are required and the processability is remarkably inferior for the control of the size of the predetermined R. Moreover, the facing angle between them is not uniform because of non-uniformity of the support arm (14) and the pressure spring (16) in their manufacture. Therefore, the value R for allowing such non-uniformity is large, and the flat area of the magnetic head slider (15) required for the stable sliding is reduced disadvantageously. The parallel condition of the surface of the magnetic head (15) and the surface of the medium (2) at the circumferential direction is often deviated in the rotation of the medium (2) by not only shape of the edge (19) but also distortion of the support arm (14), and the stick motion is caused by the contact of the forward edge of the magnetic head (15) in operation, so that the peeling of the magnetic coated membrane is disadvantageously caused in an earlier stage. Moreover, the rigidity of the flat cable (21) is comparable to the rigidity of the arm part (22), (22) of the support arm (14) whereby the following is also obstructed.

The disadvantages of the conventional head assemblies of double side type flexible magnetic disc drive apparatus have been discussed.

The supporting mechanism of the present invention will be illustrated hereunder. The features of the present invention are depending upon the following characteristics of the known plane gimbal spring which has round symmetrical shape with two-way compliance, the desired rigidity in the plane direction and the additional functions required for the sliding type disc memory.

The modified two-way plane springs having such gimbal function have been used as the supporting mechanisms for the floating type magnetic heads. However, as described above, they have been the floating type apparatus whereby the rigidity in the plane two-way has not been important because of a small coefficient of friction of air.

In accordance with the present invention, the gimbal spring is used in the contact type apparatus thereby requiring rigidity for withstanding the friction caused by the medium (2) and the vibration of the magnetic head (15) caused by the vertical flutter of the flexible medium which causes the running of the magnetic head on the slant surface of the medium and the rigidity for holding precisely the magnetic head position on the data track during operation.

At the same time, a quick following response of the magnetic heads to the vertical flutter of the medium (2) in its rotation is required.

The sliding type apparatus should be carefully designed in view of the above-mentioned functions which are not required for the floating type apparatus.

In the apparatus of the present invention, various functions are improved over the conventional double side type apparatus already mentioned.

SUMMARY OF THE INVENTION

It is an object of the present invention to provide a magnetic head supporting mechanism having a signal gimbal spring for supporting a sliding type magnetic head which has a simple structure and can be easily prepared and is suitable for a double side type flexible disc drive apparatus.

It is another object of the present invention to provide a magnetic head supporting mechanism which reduces flutter of a double side type flexible disc caused in its rotation by holding the disc under pressure by a pair of holders.

The foregoing and other objects have been attained by providing a magnetic head supporting mechanism fitted to a magnetic head positioning carriage of an interchangeable double side type flexible magnetic disc drive apparatus, wherein the carriage comprises first and second arms and first and second magnetic head assemblies; and at least one of the first and second arms is rotatable to depart from or contact the double side flexible disc; and each magnetic head assembly is mounted on the first or second arm having at least one of the sliding type magnetic head for slide contact with the surface of the flexible disc; and each of the first and second magnetic head assemblies comprises a holder mounted on the first and second arm and a gimbal spring formed between the holder and the sliding magnetic head.

BRIEF DESCRIPTION OF THE DRAWINGS

In the drawings, the same references designate the identical or corresponding parts.

DETAILED DESCRIPTION OF THE PREFERRED EMBODIMENTS

Referring to the drawings, one embodiment of the present invention will be illustrated.

The structure of the embodiment is substantially the same as that of FIG. 1 except the following feature.

Figure 6:
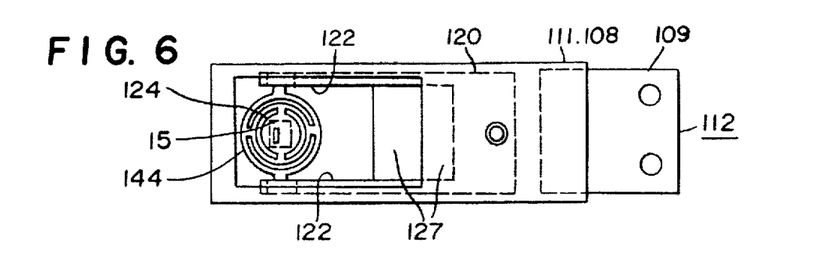
FIG. 6 is a plane view of a first embodiment of the present invention.
Figure 7:
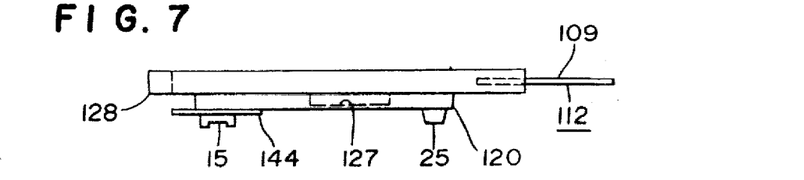
FIG. 7 is a side view of a first embodiment of FIG. 6, of the present invention.

In FIGS. 6 and 7, the reference numerals (108), (111) respectively designate upper and lower arms having the same shape as those of the conventional ones except eliminating the projections (23), (23) of the arms (8), (11) for hanging and detaching the support arm (14) from the medium (2).

In the conventional apparatus, the projections are formed in order to shorten a time applying a large force of the pressure spring (16) to the medium (2) in the step of detaching or touching. However, in the present invention, the pressure force is applied for the head slider (15) from the upper arm (108) or the lower arm (111) by a round symmetrical shaped cross fulcrum gimbal spring (144) instead of a pressure spring (16) whereby the deviation of facing angles seen in the conventional apparatus is not notable and the projections are needless. A branched holder (120) is used for mounting the gimbal spring (144) and has a branched end (122), (122) as a fork as shown in the drawing. The gimbal spring (144) is bonded or welded by a spot welding at the end of the holder in one piece. A magnetic head (15) is firmly bonded on a central circular part (124) of the gimbal spring (144) with adhesive, etc. A desired hole for fitting an assembled magnetic head (15) can be formed at the center of the circular part (124). The normal method of fitting the head (15) on the gimbal spring, is a method of fitting the ring type head core itself into its hole to use the core surface at the side of the magnetic gap as a floating surface; or a method of fitting the head core into a shoe and mounting a female screw nut in the shoe and fitting it to the gimbal spring with a small bolt. In the former method, the bonding force between the core and the spring is depending upon the side surface of the hole of the spring as its center and accordingly, it has poor reliability. On the other hand, in the latter method, the reliability on its strength is high, but it is disadvantageous in view of the manufacturing cost.

A corner part (127) is formed in the side of the holder (120) at the side fixed with the upper or lower arms (108), (111) whereby the flat cable (21) etc. can be held smoothly. This is considered to prevent the rigidity of the cable (21) from adversely effecting the gimbal spring (144).

The functional advantage of the structure is as follows. When the upper arm (108) and the lower arm (111) are turned to the sides of the medium (2), each around the edge of the plate spring (109) fastened to the carriage (7), the head assembly (120) supported on the arms (108), (111) approaches the medium (2). In the step of approaching the edges (128) of the arms (108), (111) to the arm receiving surface (29) of the carriage (7), the magnetic head (15) supported on the gimbal spring (144) is brought into contact with the medium and it begins to be bent by the contact pressure thereby the contact force builds up from a minimal value. Moreover, the angle between the head surface (15) and the medium (2) is small because of no deviation force caused by the pressure spring (16) to the support arm (14) as in the conventional apparatus, and the roundness R value of the head (15) can be remarkably reduced.

The gimbal spring (144) which can be compact in comparison with the support arm (14) in the conventional apparatus, has less strength caused by releasing stress caused by cutting. Thus, the parallelism of the head (15) with the circumferential direction of the medium (2) in its rotation can be easily maintained. As well as the stick motion can be remarkably reduced and the pressure can be uniformly applied to the surface of the head (15) as the pressure force can be held perpendicular at the center of the head (15). Accordingly, there is no instability factor for the signal amplitude modulation which is caused in the conventional apparatus. In comparison with the conventional apparatus, the instant shock at the touching is weakened to reduce remarkably the wear of the medium (2).

As well as the improvement of the function, the accuracy of parts in the preparation can be maintained because of its simple structure. In the conventional magnetic head assembly (12), (13), the required accuracy in its assembly is not easy to realize even though a special tool is used thereby causing a trouble in its preparation. In accordance with the system of the present invention, it is quite simple. The unstable support arm (14) in its longitudinal direction in the conventional apparatus is replaced by the holder (120) having high rigidity. This advantage is attributed to this invention.

The second embodiment of the present invention which has a pushing function for controlling the opening windows of a disc jacket so as to improve the characteristics of the gimbal spring of the first embodiment will be illustrated.

Figures 8, 9:
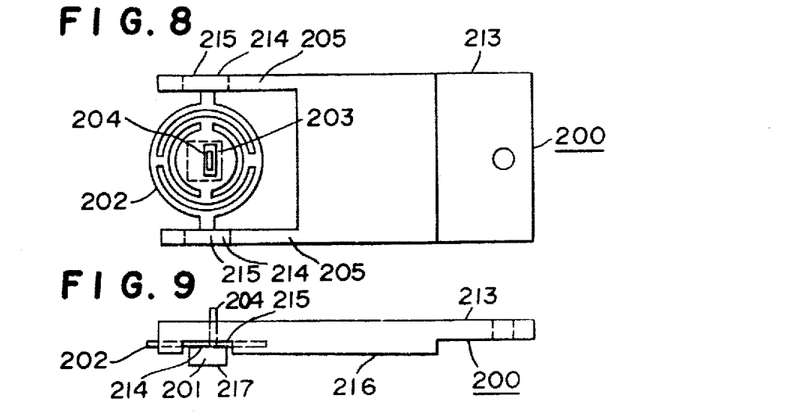
FIG. 8 is a plane view of a magnetic head supporting mechanism of a second embodiment of the present invention.
FIG. 9 is a side view of the second embodiment of FIG. 8 of the present invention.

Referring to FIGS. 8 and 9, the head assembly in the second embodiment of the present invention will be illustrated.

The head (201) is the same as the conventional slide type magnetic head and the support arm (14) used in the conventional apparatus is replaced by the known symmetrical round gimbal spring (202) adopted for the present invention. The magnetic head (201) is mounted at the center of the gimbal spring (202). A hole (203) is used for inserting the head core (204) and bonding it to the spring (202). The reference numeral (205), (205) designates arms of a branched holder (213) on which the flat surfaces (215), (215) are formed in lower step from the surface (216) of the holder (213) at the medium side. The fitting edges (214), (214) of the gimbal spring are bonded to the flat surfaces (215), (215) by spot welding or adhesive. Thus, the predetermined distance is given between the surface (216) and the slide surface (217) of the magnetic head (201).

Figure 10:
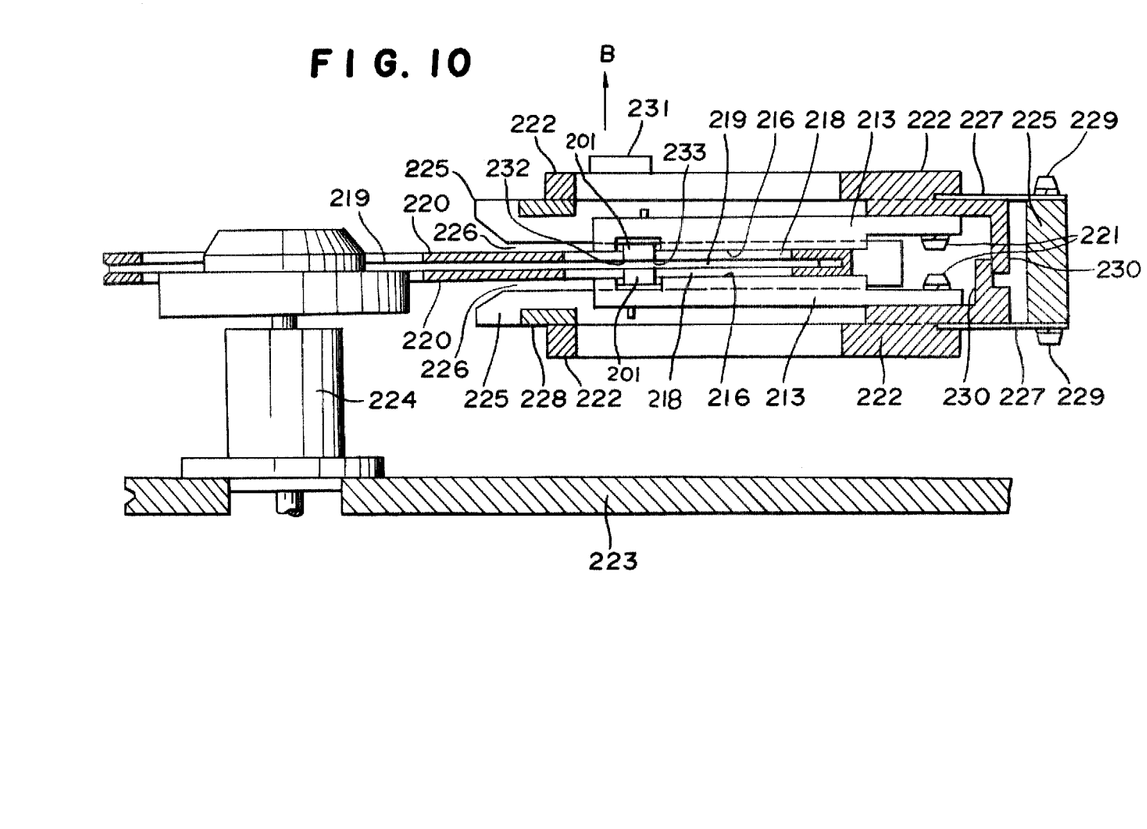
FIG. 10 is a partially broken sectional view of a main part of a flexible disc drive apparatus equipped with the magnetic head supporting mechanism of the second embodiment of the present invention.

Referring to FIG. 10, the operation of the apparatus of the second embodiment of the present invention will be further illustrated.

In FIG. 10, the opening windows (218), (218) of the jacket (220) for the double side type magnetic recording medium (219) are formed and the magnetic heads (201), (201) are brought into contact with the recording medium through the windows under pressure to write in or to read out signal data. The recording medium (219) is flexible and is locally undulated as a characteristic of a plastic sheet whereby it is difficult to use in bare style. The recording medium is usually held in a jacket having flexibility to ensure easy handling, protection from damage and to control the undulation of the medium called as the Flexible Disk Cartridge or commercially Diskette. The jacket edges at the opening (218), (218) are easy to separate from the medium (219), whereby a thickness of the cartridge is varied. This causes a larger flutter of the recording medium (219) passing below the opening windows (218), (218). The flutter at the part causes troublesome output amplitude modulation.

In the second embodiment, the surface (216) of the holder (213) is located so as to push on the jacket (220) softly from its upper and lower side of the jacket around the windows as shown in the drawing. This is an additional mean besides the platen and bail nearer to the windows. Accordingly, the flutter of the recording medium (219) in the jacket (220) is reduced. The soft pushing of the jacket around the opening windows (218), (218) by the holders (213), (213) is designed also to prevent troublesome interference of the jacket (220) with the gimbal spring (202). On the other hand, all improvements are kept in the same manner as illustrated in the first embodiment of the invention. The unstable function of directivity of the pressure force to the recording medium which is a problem in the conventional magnetic head supporting mechanism having the frame type support arm (14) can be eliminated by replacing the pressure spring (16) by the gimbal spring (202) which easily coincides with the supporting point of the pitching and rolling motions to the center of the magnetic head (201).

In the conventional apparatus, the support arm (14) has uncertain length with flexibility and distortion, so that the reliability for track positioning is poor. However, both edges (214), (214) of the gimbal spring (202) used in the present invention are firmly mounted on the holder (213) whereby the rigidity is high enough and the reliability of the positioning is remarkably high. The control of the pressure force can be excellent since it depends upon only the variation of the thickness of the gimbal spring (202).

In this embodiment, the surface (216) of the holder (213) directly pushes the jacket (220). However, it is possible to modify it to an embodiment involving projecting a part of the rotary arm (222) fitting the holder (213) or an embodiment involving bonding felt or sponge rubber sheet on the surface (216) of the holder (213).

From the viewpoint of protecting the interference of the jacket (220) with the gimbal spring (202), it is sufficient to form the stepping surfaces (215), (215) sink from the surface of the holder (216) without pushing the jacket by the surface of the holder (213). Thus a purpose of the invention can be satisfied.

Referring to FIG. 10, the apparatus having the supporting mechanism of the present invention will be further illustrated. The magnetic recording medium (219) is fitted to the rotary spindle fixed to the body base (223) with a fastening bolt (not shown) and it is rotated. The spindle (224) is rotated through a belt (not shown) driven by a motor (not shown). The body base (223) usually has a box shape. In the drawing, only the bottom is shown. A carriage (225) is driven in the drawing, only the bottom is shown. The carriage (225) is driven linearly by the rotation of male screw driven by a stepping motor (not shown) wherein the male screw (not shown) is fitted to a female screw (not shown) formed on the carriage (225), or driving by belt from the pulley coupled to a stepping motor (not shown).

The stepping motor is firmly mounted on one surface of the box type body base (223). The carriage (225) is supported by a guide shaft (not shown) for the linear guide. The guide shaft is suspended on two poles (not shown) standing on the bottom of the body base (223). The linear reciprocal movement of the carriage (225) to the rotary center of the recording medium (219) can be performed by sliding on the guide shaft fitted to the guide hole (not shown) of the carriage (225). A guide slot (226) for the disc cartridge is located on the carriage, and each receiving part (228) is formed on the carriage at the end of the rotary arm (222) at both upper and lower parts. A plate spring (227) is mounted on the other end of the rotary arm (222). The other end of the plate spring (227) is firmly fitted to the carriage (225) with a screw (229). A pedal (230) is formed in one piece at the bottom of the rotary arm (222). The upper and lower rotary arms are assembled to make contact of both pedals (230), (230). A lift arm (231) is formed in one piece on one side surface of the end of the upper rotary arm (222). The arm (231) is pulled up by a magnet (not shown) mounted on the body base (223) to the arrow direction B. When the magnet is stopped energizing, it is returned to the condition of FIG. 10 by the force of the plate spring (227).

The lower rotary arm (222) is turned by pushing the pedal (230) of the lower rotary arm (222) by the movement of the upper rotary arm (222).

The operation of the magnetic head supporting mechanism equipped with the rotary arms (222), (222) which drive as mentioned above, has been illustrated.

The supporting mechanism of the present invention is different from the conventional supporting mechanism. In the latter, the head edge (232) is firstly landed on the recording medium whereas in the former, the head edge (233) is firstly landed on the recording medium. In the former, the inner deviation i.e. the pushing force is initially applied to the medium (219) and the angle of the sliding surface of the head (201) to the surface of the medium (219) is larger depending upon the deviation of force whereby the medium is notable. In the former, the edge (233) is brought into contact with the surface of the medium (219) and the pressure force is gradually increased and the angle is remarkably small whereby the medium wear can be remarkably small.

Referring to FIGS. 11 to 17, a sliding magnetic head supporting mechanism having an excellent medium following function will be illustrated as a third embodiment of the invention.

Figure 11:
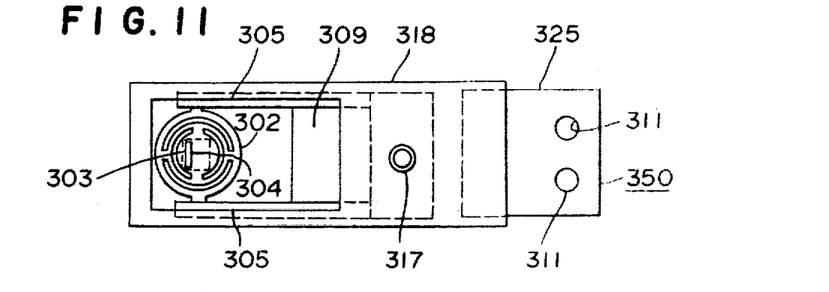
FIG. 11 is a plane view of an improved head supporting mechanism, substantially the same as FIG. 6, which is used as a mechanism for the upper surface of a disc (316) in a third embodiment of the present invention.
Figure 13:
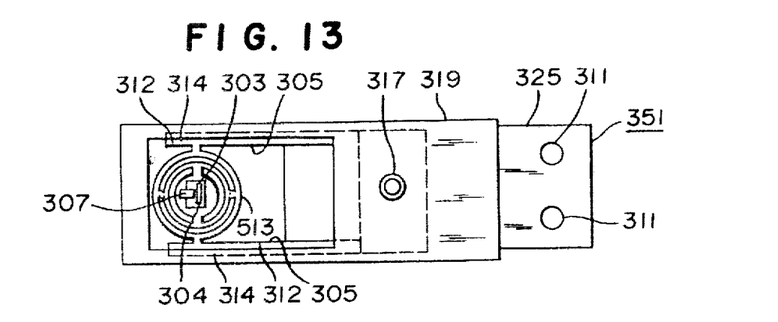
FIG. 13 is a plane view of the head supporting mechanism for the lower surface of the disc (316) of a third embodiment of the present invention.

In the third embodiment of the present invention, the magnetic head assembly (350) shown in FIG. 11 similar to the magnetic head assembly (112) of FIG. 6 and the magnetic head assembly (351) shown in FIG. 13 which has different structure from the magnetic head assembly (350), are combined.

Figure 12:
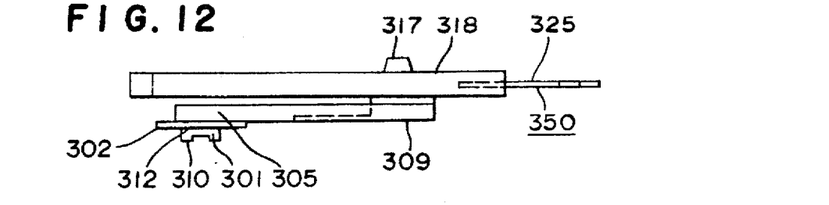
FIG. 12 is a side view of FIG. 11.

In FIGS. 11 and 12, the magnetic head assembly (350) comprises the sliding type magnetic head (301), the gimbal spring (302), the rectangular hole (303), the head core (304), the branch arm part (305), the branched holder (309), the sliding surface (310), the fitting hole (311), the fitting edge (312), the fitting screw (317), the upper rotary arm (318) and a plate spring (325) as those of FIGS. 6 and 7.

Figure 14:
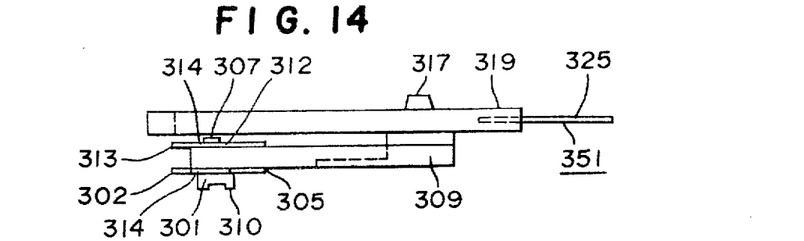
FIG. 14 is a side view of FIG. 13.
Figure 15:
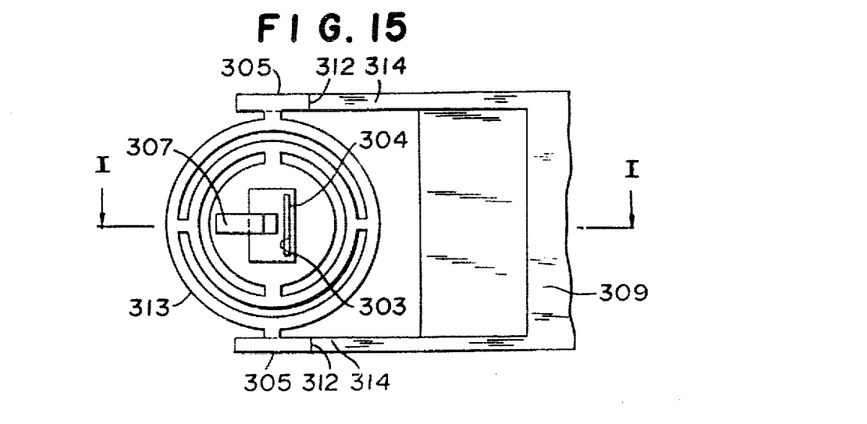
FIG. 15 is a partially enlarged plane view of a main part as the holder (309) etc. shown in FIG. 13.

Referring to FIGS. 13 and 14, the other magnetic head assembly (351) will be illustrated.

Figure 16:
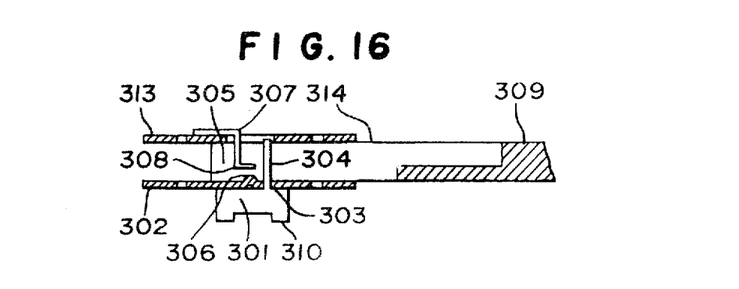
FIG. 16 is a sectional view taken along the line I-I of FIG. 15 as the supporting mechanism for the lower surface of the disc (316)

The known gimbal spring (302) i.e. a symmetrical round shaped two way flexible cross fulcrum plate spring is used in the embodiment. The gimbal spring (302) is used instead of the support arm (14) having a long rectangular shape of FIG. 3. The gimbal spring (302) shown in FIG. 11 has, at the central part, a rectangular hole (303) in which the head core (304) is inserted and bonded at the predetermined position. The branch arm part (305) of the holder (309) is provided for bonding the fitting edges (312), (312) of the gimbal spring (302) on the branched holder (309) by spot welding or adhesion. The part having the function of the present embodiment is assembled at the back side of the fitting surface (305) of the gimbal spring (302); that is the other gimbal spring (313) having the same shape for its spring functional part and its fitting edges as those of the gimbal spring (302), however, a load arm (307) is formed in one piece instead of the head (301). A predetermined space is kept between the edge (308) of the load arm (307) and the top of a projection (306) formed on the gimbal spring (302) as shown in FIG. 16. The projection (306) is the same as the projection (18) formed at the support arm (14) as the known rectangular frame type plate spring. The top of the projection also corresponds to the center in its plane view of the magnetic head (301).

The gimbal spring (313) is mounted on the back surface (314) of the branched ends (305), (305) of the holder (309) by a spot welding, etc. by the same manner to correspond its center to the center of the gimbal spring (302) in plane view.

In this embodiment, a gap is formed between the load arm (307) and the projection (306). However, it is possible to arrange them to be brought into contact with each other under non-load condition.

The main structure of the improved embodiment has been described. The present embodiment of the magnetic head supporting mechanism and its operation will be described in detail.

Figure 17:
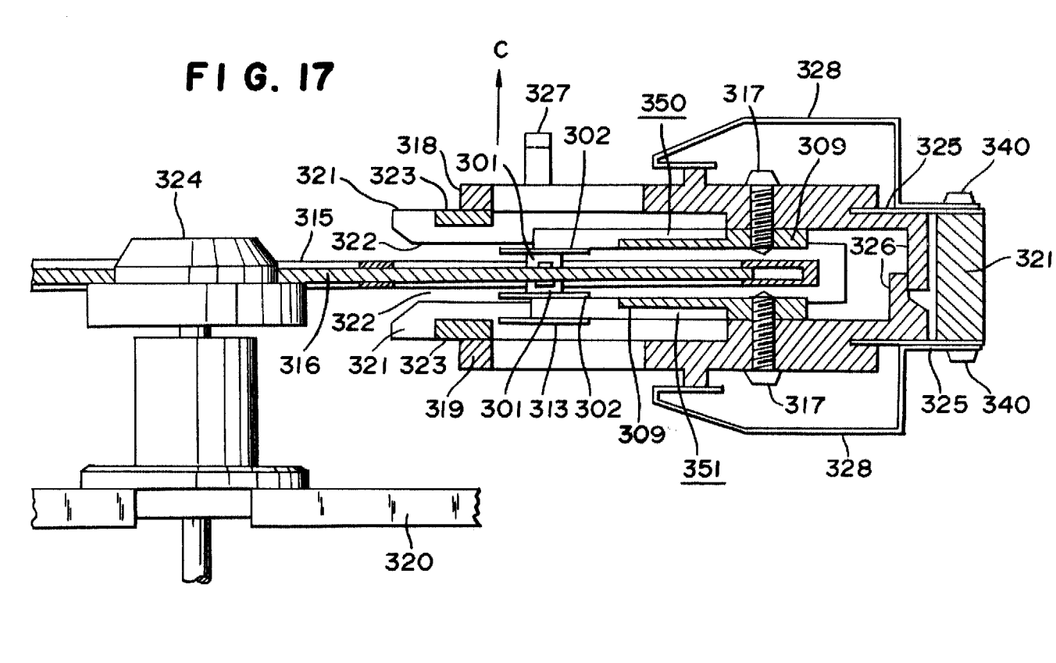
FIG. 17 is a sectional view of the head supporting mechanism as the principal part of the double side type flexible magnetic disc drive apparatus of the third embodiment of the present invention which shows the head positioning mechanism as a carriage (312).

FIG. 17 shows the supporting mechanism for supporting the head (301) through the gimbal spring (302) on the holder (309). The magnetic head assembly (350) shown in FIG. 11 is firmly fixed on the upper rotary arm (318) with the screw (317) so as to locate the head on the upper surface of the disc (316) in the disc cartridge (315). The magnetic head assembly (351) shown in FIG. 13 is firmly fixed on the lower rotary arm (319) with the screw (317) to locate on the lower surface of the disc (316). The magnetic head assembly (350), (351) are fixed on rotary arms (318), (319) and they are fixed with a screw bolt (340) at the rear part of the plate spring (325).

The flexible disc (316) is fitted on the rotary spindle (324) fixed on the body base (320) with the fastening bolt (not shown) to be rotated. The spindle (324) is rotated by the belt (not shown) driven by the motor (not shown). The structure of the body base (320) is not shown, but it is usually a box shape. Only a part of the bottom of the body base is shown. The carriage (321) is used for the linear movement for positioning to the desired track on the disc (316) to read or write. The linear movement is generated, for example, on a female screw on the carriage by rotating the male screw (not shown) driven by the stepping motor (not shown).

The rotation of the carriage (321) by the screw is stopped and only linear movement is given by forming a U-shape guide or a round hole on the carriage (321) fitting to the guide shaft (not shown). The shaft is held in suspended form on the body base (320). This is not shown in the drawing.

A guide slot (322) for the disc cartridge (315) is formed on the carriage, and each receiving part (323) is formed at each end of the upper and lower rotary arms (318), (319). Each plate spring (325) is mounted in one body at the other end of the rotary arm (318) or (319). The other free end of the plate spring (325) is firmly fixed on the rear part of the carriage (321) with a screw bolt (340). Each pedal (326) is formed in one piece on each rotary arm (318), (319) at its rear bottom and the rotary arms are combined to be brought in to contact each other. A lift arm (327) is formed in one piece near the front end of the upper rotary arm (318). The arm (327) is pulled up to the arrow direction C by the magnet (not shown) mounted on the body base (320). When the magnet is stopped energizing, the arm is returned to the condition shown in the drawing by the function of the plate spring (325) and the auxiliary spring (228). Accordingly, the magnetic head (301) can be brought into contact with the disc (316).

The characteristic function of the third embodiment in the operation to the final contact will be further illustrated.

When the magnet is stopped energizing, the upper rotary arm (318) is falling to approach the disc surface (316). The upper and lower rotary arms (318), (319) are moved to promote the approach of the magnetic heads (301), (301) to respective surfaces of the disc (316) as shown in the drawing upon cessation of the pushing force applied to the lower pedal part (326) pushed by the upper pedal part (326).

When the sliding surface (310) of the magnetic head (301) on the lower rotary arm (319) begins to make contact with the surface of the disc (316), the bending operation of the gimbal spring (302) is started. When the bending degree increases, the top of the projection (306) on the magnetic head (301) is brought into contact with the end (308) of the load arm (307). After that time the pressure force increases rapidly given by the two gimbal springs (302), (313), to form a bending point of the load-bending curve.

During further falling of the rotary arm (319) to the medium (316) to reach the end (323) of the carriage (321), the magnetic head (301) gradually come close to the arm (319) to store the strain energy being equal to the pressure force supported by the gimbal springs (302), (313).

On the other hand, the upper rotary arm (318) hold only one gimbal spring (302), and accordingly, the load-bending curve is substantially linear until the finish of the operation. At the finish of the operation, that is, the stationary condition of the rotary arms (318), (319), the magnetic heads (301), (301) are pressed against each other by the spring forces of the gimbal springs (302), (302) and (313) to be balanced in the principle of action and reaction.

When the disc (316) is rotated at the balanced condition, the surface is vertically vibrated by its own undulation and dynamic flutter of the medium (316), however, the projection (306) of the lower magnetic head (301) is brought into contact with the load arm (307) on the gimbal (313) and the gimbal spring (313) is vertically moved to follow the movement of the disc (316), whereby the gimbal spring (302) equipped with the magnetic head (301) is moved around the contact as the rotary center of the rolling and pitching.

On the other hand, the upper magnetic head (301) is in a condition of sliding in contact with the upper surface of the disc (316) and does not have a rotary center for the rolling and pitching in it as that of the lower magnetic head (301). However, the moment of the following movement of the lower magnetic head (301) is transferred through the disc (316) and the upper magnetic head also follows the surface of the disc (316) in conjunction with the upper gimbal spring (302). Accordingly, a pseudo rotary center is given for the upper magnetic head (301) by the projection (306) and the gimbal spring (313) etc.

As described in detail, in the magnetic head supporting mechanism of the third embodiment of the present invention, the undesired operation caused by the conventional supporting mechanism of FIGS. 1 to 4 having the upper and lower projections can be prevented. The rotary center is given in comparison with the first embodiment whereby a highly sensitive following characteristic even for a small moment, is given.

The second gimbal spring (313) and the load arm (307) are shown, however, a projection (306) can be formed on a cantilever spring instead of this gimbal spring (313), as the other embodiment of the present invention. In order to maintain a good following characteristic for a vertical movement of the disc (316), it is very suitable to form a pair of cantilever springs in parallel, with a projection in one piece. The second gimbal spring (313) can be added to the upper arm (318) in the reversed manner as the above illustration. The gimbal springs are illustrated as a round type, but it can be designed to be a symmetrical rectangular shaped cross fulcrum type. These modifications can be understood from the above description.

What is claimed is:

1. In an interchangeable double side type flexible disc drive apparatus, wherein a pair of magnetic heads are supported on a magnetic head supporting mechanism fitted to a magnetic head positioning carriage, adapted for positioning of the magnetic heads on the opposite surfaces of a flexible magnetic disc, an improved magnetic head supporting mechanism comprising:

first and second support arms;

first and second magnetic head assemblies mounted on said first and second support arms respectively and each having at least one contacting type head slider for making flexible sliding contact with a respective surface of said flexible disc, each slider movable at least in a direction normal to said disc;

both of said support arms rotatable about said carriage to be detachably removed from said flexible disc;

each of said head assemblies including projected two rigid bases of a holder on which is mounted a symetrically shaped cross fulcrum gimbal spring for supporting symmetrical outer parts of said spring, each said spring having symmetrical multi-grooves and each said spring coupled on a central circular part thereof to a respective contacting slider for biasing said respective head against a respective surface of said flexible disc.

2. A magnetic head supporting mechanism according to claim 1, wherein at least one of said head assemblies further includes:
a resilient material mounted on said holder and coupled via a fulcrum to the center of the gimbal spring after contact of said spring to said disc;
wherein the resilient material provides further biasing of said contacting slider against said surface of said flexible disc only after contact of said head with said disc.

3. A magnetic head supporting mechanism according to claim 2, wherein said resilient material comprises:
a symmetrically shaped cross fulcrum gimbal spring.

4. A magnetic head supporting mechanism according to claim 3, wherein said resilient material comprises:
a cantilever spring.

5. A magnetic head supporting mechanism according to claims 1 or 2, wherein each support arm and its respective holder are formed as one piece.

6. In an interchangeable double side type flexible disc drive apparatus, wherein a pair of magnetic heads are supported on a magnetic head supporting mechanism fitted to a magnetic head positioning carriage, adapted for positioning of the magnetic heads on opposite surfaces of a flexible magnetic disc, said disc provided with a jacket, an improved magnetic head supporting mechanism comprising:
first and second support arms;
first and second magnetic head assemblies mounted on said first and second support arms respectively and each having at least one contacting type head slider for making sliding contact with a respective surface of said flexible disc;
each of said head assemblies including a relatively rigid branched holder on which is mounted a spring coupled to a respective contacting slider for biasing said respective contacting slider against the respective surface of said flexible disc; and
said holders each including a part for contacting the disc jacket to reduce flutter caused in rotation of the disc.

7. A magnetic head supporting mechanism according to claim 6, wherein said spring comprises:
a symmetrically shaped cross fulcrum gimbal spring.

* * * * *